United States Patent [19]

Gibbons et al.

[11] Patent Number: 4,806,399

[45] Date of Patent: * Feb. 21, 1989

[54] FLAVOR/AROMA POLYCARBONATE BARRIER LAMINATES FOR PAPERBOARD CARTONS

[75] Inventors: Charles E. Gibbons; Joe L. Kinsey, Jr.; Allan A. Whillock, all of Mobile, Ala.

[73] Assignee: International Paper Company, Purchase, N.Y.

[ * ] Notice: The portion of the term of this patent subsequent to Oct. 6, 2004 has been disclaimed.

[21] Appl. No.: 55,628

[22] Filed: May 29, 1987

[51] Int. Cl.$^4$ ................................. B27N 5/08
[52] U.S. Cl. ................... 428/34.2; 428/412; 428/349; 428/511; 428/516
[58] Field of Search ............... 428/35, 516, 4.2, 511, 428/349

[56] References Cited

U.S. PATENT DOCUMENTS

| | | | |
|---|---|---|---|
| 4,513,036 | 4/1985 | Thompson et al. | 428/35 |
| 4,513,037 | 4/1985 | Thompson et al. | 428/35 |
| 4,698,246 | 10/1987 | Gibbons et al. | 428/35 |
| 4,720,425 | 1/1988 | Hattori et al. | 428/412 |
| 4,734,331 | 3/1988 | Giles et al. | 428/412 |

Primary Examiner—Edith Buffalow
Attorney, Agent, or Firm—Walt Thomas Zielinski; Stewart L. Gitler

[57] ABSTRACT

The present invention relates to an improved container for citrus juices and other liquids. The container utilizes a paperboard barrier laminate for the containment of essential oils and flavors. Also disclosed is a process of making the laminate. The laminate makes use of a layer of a heat-sealable polycarbonate polymer food contact layer to enhance the barrier properties of the laminate.

6 Claims, 3 Drawing Sheets

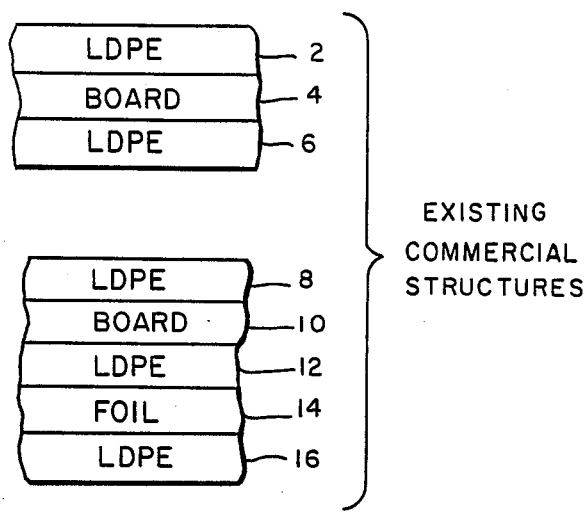
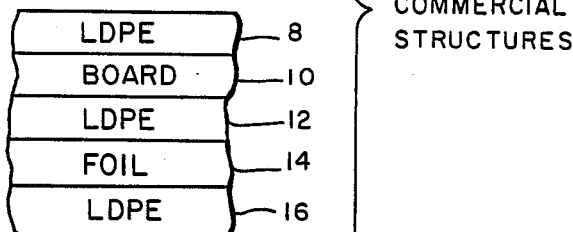
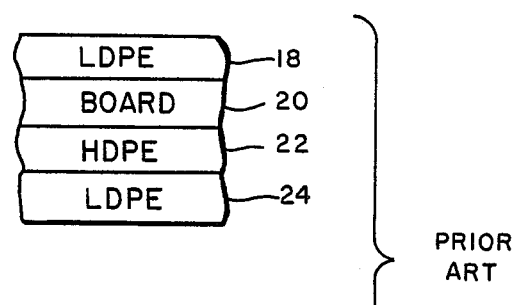
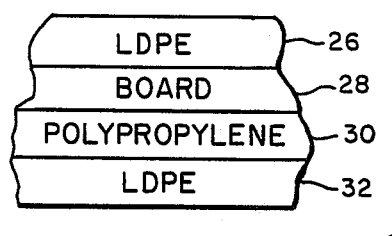
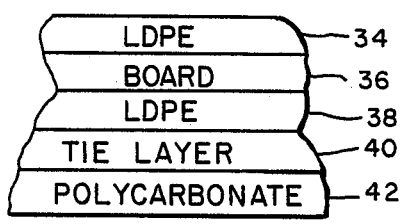
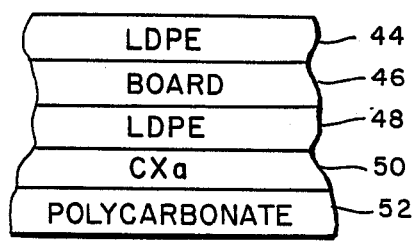

FLAVOR/AROMA POLYCARBONATE BARRIER LAMINATES FOR PAPERBOARD CARTONS

CROSS-REFERENCE TO RELATED APPLICATIONS

The claimed invention is related to U.S. patent applications Ser. Nos. 836,286, filed Mar. 5, 1986, and 864,142, filed May 16, 1986, and the case was commonly owned at the time it was made.

BACKGROUND OF THE INVENTION

The invention relates to heat-sealable barrier laminates for the containment of essential oils and the prevention of loss of vitamin C in paperboard cartons, as well as to a process for making such laminates. More particularly, this invention relates to barrier laminates which are comprised of an improved heat-sealable product contact material which does not absorb or transmit flavor or odor ingredients of citrus and other juices or liquids.

Heat-sealable low-density polyethylenes are well known to be components of current paperboard citrus juice cartons which provide no barrier to absorption and/or transmission of citrus juice essential flavor-/aroma oils. Additionally, it is well known that impermeable materials such as aluminum foil, polar materials such as: polyamides, polyethylene terephthalates, polyvinylidene chlorides, polyvinyl chlorides, etc., and highly crystalline non-polar materials such as high-density polyethylene and polypropylene provide varying degrees of barrier to the absorption and/or transmission of non-polar citrus juice flavor oils such as d-Limonene, et al. However, these materials could not be substituted for low density polyethylene since they lacked the requisite heat-sealability over a practical temperature range, necessary FDA clearance for direct contact to foods, stress cracking resistance and cutability during the scoring, and/or die cutting conversion processes. Due to the failures of these impermeable materials, past efforts have concentrated on using a combination of these flavor-oil resistant materials with low density polyethylene as the heat-sealable component.

The existing commercial structure for a paperboard carton for juice and similar products has utilized an easily heat-sealable barrier laminate composed of paperboard sandwiched between two layers of low density polyethylene (LDPE). The LDPE is an inexpensive heat-sealable moisture barrier to prevent loss of essential oils and flavors. The conventional structure falters in that the LDPE layer absorbs the essential oils of the juice after short periods of time causing integrity decay of heat seals and stress cracking of the layer. Additionally, the conventional structure provides virtually no barrier resistance to oxygen causing the juice to lose vitamin C in large amounts.

One other conventional structure adds two additional layers to the structure identified above, namely a foil layer and an additional LDPE layer. The expensive foil layer increases barrier resistance to the flow of oxygen, while the additional LDPE allows for ultimate heat-sealability of the laminate. The improved conventional structure has poor barrier properties relating to the absorption of essential oils and aromas, since the interior contacting layer is still LDPE.

The object of the present invention is to produce an improved juice packaging heat-sealable laminate material which does not absorb or transmit flavor/odor ingredients of citrus and other juices or liquids.

SUMMARY OF THE INVENTION

The preferred embodiment of the present invention reveals a heat-sealable barrier laminate providing an almost complete barrier to the loss of essential flavor oils over the shelf life period of the carton and far beyond the six week period as well. The preferred embodiment comprises from the outer surface to the inner surface contacting the essential oils and/or flavors: an exterior layer of low density polyethylene, a paperboard substrate, an interior layer of low density polyethylene, a tie layer and a layer of a polycarbonate polymer, said tie layer and polycarbonate polymer layer being coextruded onto said low density polyethylene layer, the polycarbonate polymer layer being in contact with the juice rendering the laminate heat-sealable.

The cartons constructed of the laminate of the present invention enable significant flavor oil retention of the citrus juice or other liquid contained resulting in a significant extension of the shelf life thereof of the product and permitting replacement of costly aluminum foil barriers.

The preferred polycarbonate polymer, LEXAN® 104-111 resin is available from The General Electric Company.

The present invention has produced a suitable container which has excellent barrier properties utilizing a laminate which can be heat-sealed with its exterior and interior layers being a non-polar (LDPE) and a polar (polycarbonate polymer) from front to back. The conventional theories have been that the laminate could not be heat-sealed on conventional apparatus at practical temperatures without having non-polar constituents on its ends. The liquid juice components are insoluble in the polar polycarbonate polymer material, preventing flavor oil absorption and resulting swelling, stress cracking, and plasticization, heat seal degradation as occurs with LDPE as the contact layer.

The preferred laminate of the present invention not only exhibits significant barrier properties to extend the shelf life of the juice, but the laminate is produced using conventional extrusion/coextrusion coating equipment.

Stepwise, a paperboard substrate is either flame treated or corona discharge treated, a layer of molten low density polyethylene polymer (LDPE) is placed onto the treated paperboard substrate by extrusion coating. The newly formed layer of LDPE can then be corona discharge treated or flame treated to enhance printability and in preparation for heat-sealing later in the process.

Secondly, the web is flipped over down-line and a low density polyethylene (LDPE) layer is extrusion coated onto the other exposed side of the paperboard substrate.

Thirdly, a molten tie layer and polycarbonate polymer layer are co-extruded onto the interior low density polyethylene layer. The completed laminate can now be heat-sealed from front to back (LDPE to polycarbonate polymer) at conventional temperatures (250° F. to 500° F.).

The newly formed laminate can then be scored, cut into blanks, folded and side-seam heat-sealed thereon for transport.

Once transported, the prepared blanks can be placed onto conventional equipment, such as a PurePak® machine made by Ex-Cell-0. The blanks are heat-sealed at the bottom, filled and heat-sealed at the top by the PurePak® machine to complete the filled carton.

The barrier laminate produced by the present invention not only exhibits excellent flavor component retention properties and can be easily constructed but also meets FDA approval for use in food packaging. General Electric's LEXAN® 104-111 resin is FDA approved for direct food contact and the preferred polycarbonate polymer of the invention. Other polycarbonate polymers which heat seal at low temperatures (250° F. to 500° F.) and which can be cut on conventional machinery could also be used as the contacting barrier.

Thus, until the advent of the present invention no suitable containers for the containment of citrus juices have been developed which retain the advantages of using paperboard as the base material and is an FDA approved heat-sealable barrier laminate which is economical and can be formed using conventional extrusion/coextrusion coating equipment.

The present invention described herein is particularly useful as a paperboard laminate employed in the manufacture of citrus juice or other liquid containers. Such containers which make use of a heat-seal for seaming and closing such as folding boxes, square or rectangular containers or cartons, or even cylindrical tubes.

BRIEF DESCRIPTION OF THE DRAWINGS

FIG. 1 is a cross-sectional elevation of an existing commercial structure of a laminate;

FIG. 2 is a cross-sectional elevation of an existing commercial structure of a laminate;

FIG. 3 is a cross-sectional elevation of an existing commercial structure of a laminate;

FIG. 4 is a cross-sectional elevation of an existing commercial structure of a laminate;

FIG. 5 is a cross-sectional elevation of the preferred embodiment of the laminate of the present invention;

FIG. 6 is a cross-sectional elevation of an alternate embodiment of the laminate of the present invention;

DETAILED DESCRIPTION OF THE INVENTION

Figure 7:
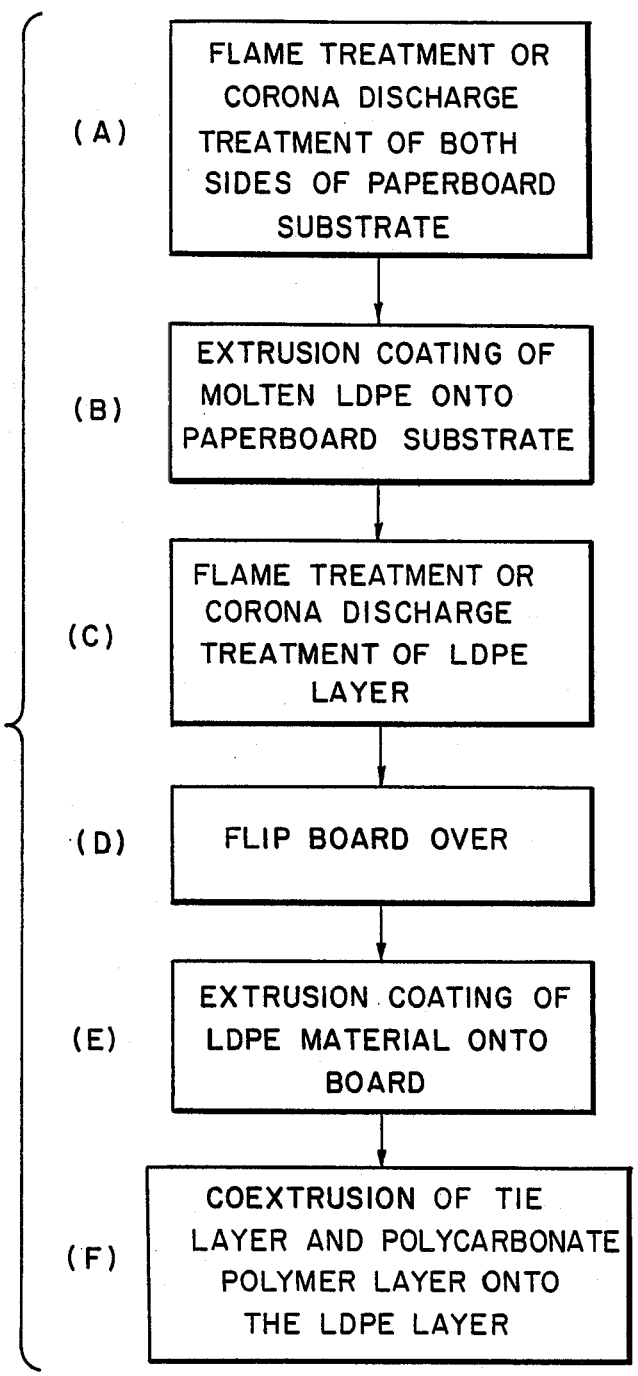
FIG. 7 is a block diagram representing the process for making the preferred embodiment of the laminate of the present invention.

The existing commercial structure for a paperboard carton for juice and similar products has made use of an easily heat-sealed barrier laminate composed of paperboard 4 (FIG. 1) sandwiched between two layers of low density polyethylene (LDPE) 2, 6. The LDPE is an inexpensive heat-sealable material which acts only to a limited extent as a moisture barrier, and to prevent loss of essential oils (flavor) and aroma. The problem encountered with conventional laminate structure has been that the essential oils of the juice (namely - d-Limonene) are absorbed into, and transmitted through, the LDPE layer causing heat seal decay, stress cracking, and swelling while stripping the juice of the essential oils. To illustrate, the conventional paperboard ½ gallon juice carton will lose 60.5% of its essential oil (d-Limonene) in a storage period of six weeks (see Table 1).

One conventional existing paperboard carton (FIG. 2) utilizes two additional layers in addition to the layers disclosed in FIG. 1 to add greater barrier resistance to the passage of oxygen and resultant loss of vitamin C. Aluminum foil 14 has been added to the laminate structure to increase the barrier's resistance to the flow of oxygen. The additional layer of LDPE 16 is needed to allow the laminate to be heat-sealed from front to back with the exterior LDPE 8 layer. The structure of the barrier laminate (FIG. 2) has poor barrier properties relating to the absorption of essential oils and aromas, since the heat-sealable contacting layer is still low density polyethylene. The shelf storage life of the juice carton made up of the barrier laminate of FIG. 2 still exhibits a percentage loss of essential oils (d-Limonene) of 35.5%, while greatly improving its barrier properties with respect to the percentage loss of vitamin C, 24% (See Table 1). The addition of the foil layer allows the laminate to exhibit excellent $O_2$ barrier properties. Although, the use of a foil layer is extremely beneficial, the increased expense makes the use of foil economically less desirable.

FIGS. 3 and 4 disclose structures of barrier laminates described in U.S. Pat. No. 4,513,036. FIG. 3 discloses a barrier laminate comprising a sandwich of LDPE 18-paperboard 20-High Density Polyethylene (HDPE) 22-LDPE 24. The laminate disclosed exhibits large losses of essential oils during its shelf life of six weeks, namely 60.5%, while also exhibiting large losses of vitamin C during the six week period, namely 87% (see Table 1). The economics and ease of fabrication of the laminates of FIG. 3 are outweighed by the poor barrier properties exhibited.

FIG. 4 discloses the preferred embodiment of U.S. Pat. No. 4,513,036, namely a barrier laminate comprising LDPE 26-Paperboard 28-Polypropylene 30-LDPE 32. The additional polypropylene layer 30 adds to the barrier properties at relatively low additional costs. The barrier properties still are extremely deficient in its resistance to the passage of oxygen and its loss of vitamin C, namely 71% after six weeks. The polypropylene laminate structure loses 39.5% of its essential oils (d-Limonene) after six weeks (see Table 1).

Both embodiments disclosed in the patent cited above do not adequately preserve the aroma and vitamin C content of the juice. The structure of the existing commercial constructions have all faced the same problem due to the necessity for heat sealing the seams and closures while forming the carton blank and while filling the cartons with juice or the like. The necessity of forming a heat seal from the front to the back of the laminate has resulted in the use of an exterior layer of LDPE and an interior layer of LDPE, both non-polar compounds which exhibit excellent heat-sealing characteristics to one another (see FIGS. 1-4).

Referring to FIG. 5, the preferred embodiment of the laminate of the present invention is shown as comprising a paperboard substrate 36 which is most suitably high-grade paperboard stock, for example, 282 lb. Milk Carton Board, to which is applied on its exterior a coating of low density polyethylene (LDPE) 34, in a coating weight ranging from about 5 to about 40 pounds per ream. Any commercial extrusion coating grade LDPE is suitable for use herein. On the back or interior portion of the laminate, namely onto the paperboard substrate 36 is extruded a layer of LDPE 38, and a coextruded tie layer 40 and a layer of polycarbonate 42. The polycarbonate polymer preferably being a heat-sealable layer composed of General Electric's LEXAN® 104-111 resin.

Referring now to FIG. 7, wherein a block diagram discloses the method of forming the heat-sealable barrier laminate of FIG. 5.

The laminate can be easily fabricated. In Step A, a paperboard substrate 36 is flame treated or cornoa discharge treated. Step B, a molten layer of LDPE 34 is extrusion coated onto the paperboard substrate 36. Step C, the LDPE layer 34 is corona discharge or flame treated in preparation for printing and subsequent heat-sealing. Step D, the web is flipped over to facilitate Step E, which has a layer of low density polyethylene 38 extrusion coated onto the paperboard substrate 36. Step F, a tie layer 40 and a layer of polycarbonate polymer 42 are coextruded onto the low density polyethylene layer 38 to complete the sandwich.

Referring now to FIG. 6, an alternate embodiment of the laminate of the present invention is shown. The embodiment utilizes an extrusion coatable adhesive (cXa) in place of the tie layer to allow a polycarbonate polymer film to be extrusion laminated onto the low density polyethylene layer. In this alternate embodiment, the paperboard substrate 46 is coated on the external surface thereof with a heat-sealable LDPE 44. On the internal surface of the paperboard substrate 46 is extruded a second low density polyethylene (LDPE) layer 48. Overlying the LDPE layer 48 is a layer of an extrusion coatable adhesive (cXa) 50. Overlying the adhesive a polycarbonate film is extrusion laminated thereon.

Adhesives which are extrudable or coextrudable, such as Dupont's c X a's, Norchem's PLEXARS, or Shell's KRATONS are suitable choices.

Figure 8:
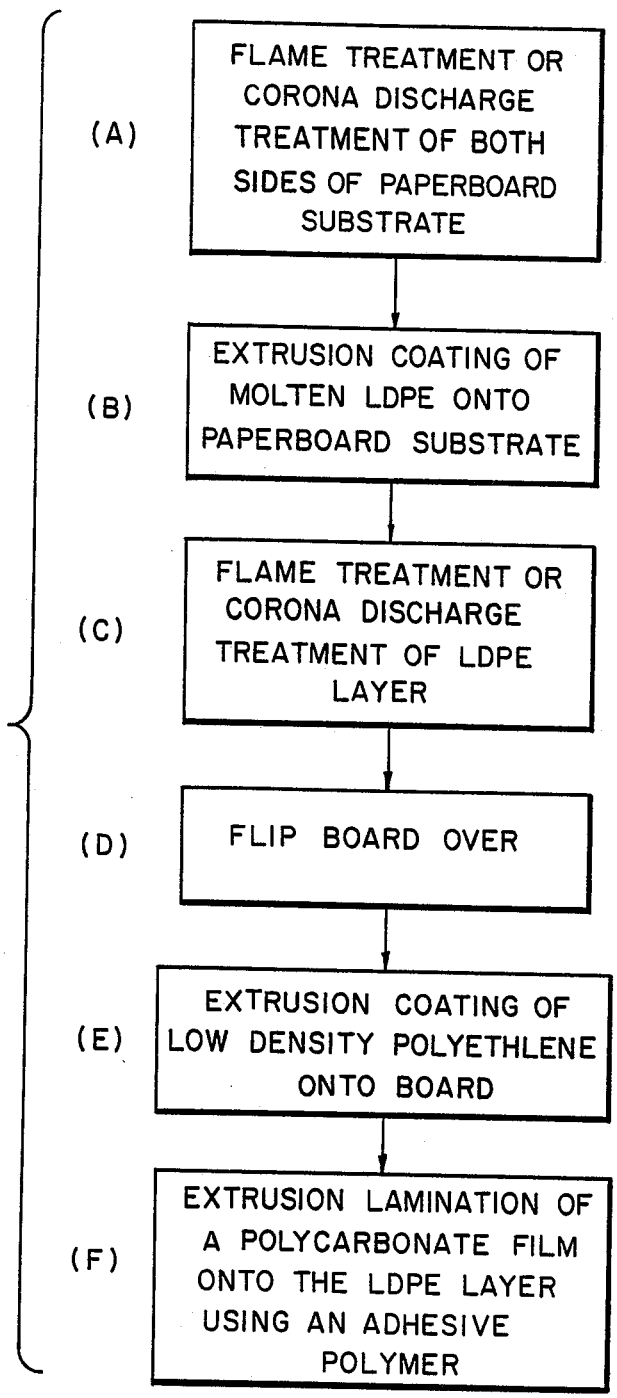
FIG. 8 is a block diagram representing the process for making the alternate embodiment of the laminate of the present invention.

Referring now to FIG. 8, wherein a block diagram discloses the method of forming the heat-sealable barrier laminate of FIG. 6.

The laminate can be easily fabricated. In Step A, the paperboard substrate 46 is flame treated or corona discharge treated. In Step B, a molten layer of LDPE 44 is extrusion coated onto the paperboard substrate 46. Step C, the LDPE layer 44 is corona discharge or flame treated to enhance printability and in preparation for subsequent heat-sealing. Step D, the web is flipped over to faciliate Step E, which has a layer of a molten LDPE 48 extrusion coated onto the paperboard substrate 46. Lastly, Step F, a polycarbonate polymer film 52 is extrusion laminated onto the LDPE adhesive layer 48 using an adhesive polymer layer 50.

Although these specific coating techniques have been described, any appropriate technique for applying the layers onto the paperboard substrate can be suitably employed.

The unique barrier effect provided by the laminate of the present invention to the % loss of essential oils is clearly demonstrated by the following example outlined in Table 1.

Standard ½ gallon juice containers were prepared and filled with juice. A typical essential oil in the juice was d-Limonene. The filled cartons were stored for a test period of six weeks after which the juice was analyzed to determine the percentage loss by weight of the essential oil d-Limonene.

All weights in lbs are given in lbs per 3000 square feet.

The six cartons tested were those shown in FIGS. 1–6 and described herein.

TABLE 1

| Test Sample ½ Gallon Juice Container | % Loss of Essential Oil |
|---|---|
| LDPE-BOARD-LDPE (FIG. 1) | 60.5 |
| LDPE-BOARD-LDPE-FOIL-LDPE (FIG. 2) | 35.5 |
| LDPE-BOARD-HDPE-LDPE (FIG. 3) | 60.5 |
| LDPE-BOARD-POLYPROPYLENE-LDPE (FIG. 4) | 39.5 |
| LDPE-BOARD-LDPE-TIE LAYER-PC (FIG. 5) - (FIG. 6) | 0* |

*Less than one percent

It can be clearly seen that the container prepared from a laminate of the present invention provides an almost complete barrier to the loss of essential oils far greater than has been present in existing structures comprising LDPE heat seal layers.

The effectiveness of the laminate of the present invention as a barrier to migration of essential oils and flavors, permits a significant extension of shelf life of containers constructed therefrom.

What is claimed is:

1. A container for liquids containing essential oils and/or flavors, said container constructed from a laminate comprising:
   (a) a paperboard substrate;
   (b) an outer layer of a heat-sealable low density polyethylene polymer coated on said outer surface of said paperboard substrate;
   (c) an inner layer of a low density polyethylene polymer coated on said inner surface of said paperboard substrate; and
   (d) a liquid contact layer comprised of a tie layer and a heat-sealable polycarbonate polymer layer which can be heat-sealed with the outside layer of low density polyethylene of the laminate on conventional equipment at temperatures ranging from 250° F.–500° F. coextruded on said outer surface of said inner layer of a low density polyethylene polymer, acting as a barrier to the loss of essential oils/flavors therethrough.

2. The container as claimed in claim 1 wherein said outer layer of a low density polyethylene polymer is corona discharge treated to enhance heat-sealability and printability of said laminate.

3. The container as claimed in claim 1 wherein said outer layer of a low density polyethylene polymer is flame treated to enhance heat-sealability and printability of said laminate.

4. A container for liquids containing essential oils and/or flavors, said container constructed from a laminate comprising:
   (a) a paperboard substrate;
   (b) an outer layer of a heat-sealable low density polyethylene polymer coated on said outer surface of said paperboard substrate;
   (c) an inner layer of low density polyethylene polymer coated on said inner surface of said paperboard substrate;
   (d) a layer of an extrusion coatable adhesive coated onto said outer surface of said low density polyethylene polymer layer; and
   (e) extrusion laminated over the extrusion coatable adhesive is a liquid contact layer of a heat-sealable polycarbonate polymer film which can heat-seal with the outside layer of low density polyethylene of the laminate on conventional equipment at temperatures ranging from 250° F. to 500° F. extrusion laminated on said adhesive layer, acting as a barrier to the loss of essential oils/flavors therethrough.

5. The container as claimed in claim 4 wherein said outer layer of a low density polyethylene polymer is corona discharge treated to enhance heat-sealability and printability of said laminate.

6. The container as claimed in claim 4 wherein said outer layer of a low density polyethylene polymer is flame treated to enhance heat-seability and printability of said laminate.

* * * * *